H. B. MASSER.
Ice-Cream Freezer.
No. 63,068.
Patented March 19, 1867.
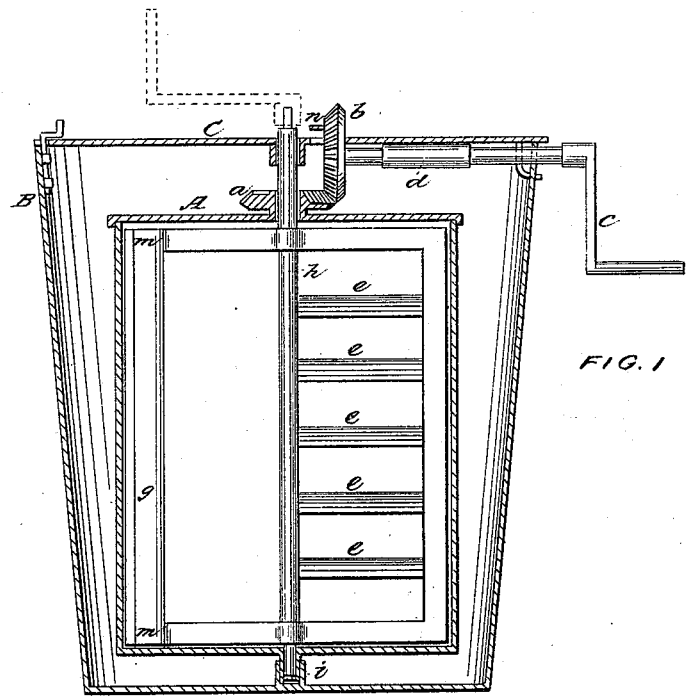
FIG. 1
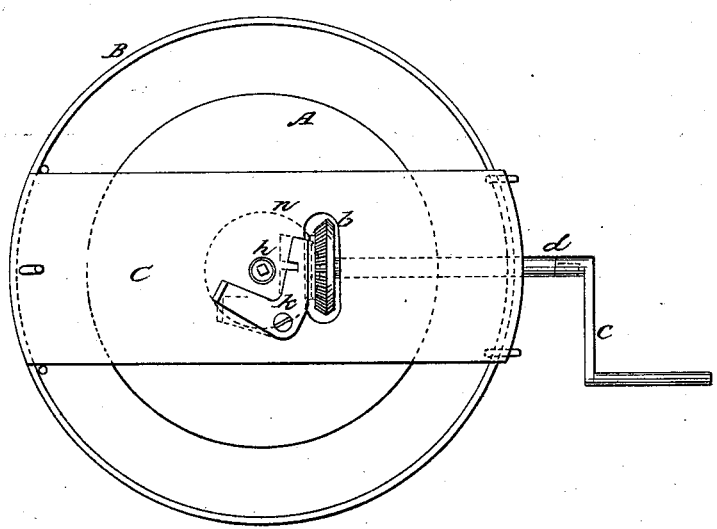
FIG. 2
FIG. 3
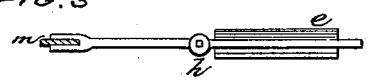
WITNESSES:
Theo Tusche
J. A. Service
INVENTOR:
H B Masser

United States Patent Office.

H. B. MASSER, OF SUNBURY, PENNSYLVANIA.

Letters Patent No. 63,068, dated March 19, 1867.

IMPROVED ICE-CREAM FREEZER.

*The Schedule referred to in these Letters Patent and making part of the same.*

TO ALL WHOM IT MAY CONCERN:

Be it known that I, H. B. MASSER, of Sunbury, Northumberland county, Pennsylvania, have invented a new and useful Improvement in Ice-Cream Freezers; and I do hereby declare that the following is a full, clear, and exact description thereof, which will enable others skilled in the art to make and use the same, reference being had to the accompanying drawings, forming part of this specification, in which—

Figure 1 is a central vertical section of my improved freezer.

Figure 2 is a top view.

Figure 3 is a detached top view of the beater.

Similar letters of reference indicate corresponding parts.

This invention relates to an improvement in ice-cream freezers, and consists in arranging a rotary freezing can, in combination with a rotary beater, in such manner that the can and the beater shall each have a distinct and separate motion, independent of the other, or a joint motion when desired; and also an improved mode of packing the side of the beater. In ice-cream freezers of my previous invention, the beater was held stationary by the cross-piece over the ice tub, whilst the can was made to revolve around the beater by cog-wheel gearing. By this method the process of beating and freezing the cream was the same, and therefore defective for the following reasons, to wit: that when the ice cream is sufficiently frozen for beating the freezing process should cease, as the cream is liable to become buttery and granular if beaten when frozen too stiff, which must be the case when the beating and freezing process are the same, that is to say, revolving the can in the ice during the whole operation. To obviate this difficulty I have applied a device to the freezer, by means of which the motion of the can and the beater, either separately or together, can be regulated as desired.

A represents an ordinary freezing-can, placed in an ice box, B, and rotated by the cog-gear wheels $a$ $b$, to be operated as usual, with a crank, $c$, on the shaft $d$. In the can A is a beater, formed by cross-slats or beaters, $e$ $e$, and a vertical fan-wing, $g$, attached to the shaft $h$, which is stepped in a socket, $i$, in the bottom of the can, and passes loosely through the horizontal cog-wheel $a$, which revolves the can, and also loosely through the cross-piece C on the top of the ice box B. The upper end of the shaft $h$ is also provided with a square for a crank to be attached, to give it motion independent of the can. For the purpose of regulating the movement of the can and the beater, either jointly or separately, I provide a button or catch, $k$, pivoted on the upper side of the cross-piece C, which catch locks and unlocks the beater shaft $h$, to make it stationary or allow it to be rotated at pleasure, and also locks and unlocks the gear-wheels $a$ $b$, to keep the can A stationary or allow it to revolve at pleasure. The catch $k$ is provided with a slot in one side, to fit upon the square of the beater shaft $h$ when turned in one direction, and thus hold it stationary, while the gear-wheels are free to move and rotate the can A; but when the button catch $k$ is turned in the other direction it strikes a projection, $n$, on the web of the cog-wheel $b$, and holds it stationary, and thus prevents the freezing-can from revolving, while the beater is free to rotate.

The operation of making cream with this improved arrangement is, first, to lock the beater shaft $h$ with the catch $k$, to hold it stationary, while the can A is revolving, as usual, for performing the freezing process, until the cream is frozen. When this is done, then the beater shaft is released, and the gear-wheel $b$ is locked to hold the can stationary, and the crank $c$ is shifted from the shaft $d$ to the beater shaft $h$, for the purpose of turning the beater alone, while the can remains stationary until the cream is sufficiently beaten and finished. The catch $k$ is also so arranged that it may have an intermediate position between the beater shaft and the gear-wheel, and not lock either of them, when the can and beater both can be made to move in the same direction after the cream has been finished, and is stiff enough to hold the beater and carry it around with the can, which third arrangement and movement is intended, when desirable, to hasten the hardening of the cream after it has been finished by beating.

The device of the catch $k$, to lock and unlock the shaft $h$, and the gear-wheel $b$, may be modified, and I do not confine my invention to the particular arrangement for effecting these objects.

The improvement in the beater packing consists in attaching an India-rubber strip, $m$ $m$, to the edge of the wing $g$, which bears constantly and uniformly on the sides of the can, and by its pressure and elasticity will adapt itself to the irregularities of the metal can, and thus cut off the thin films of cream as fast as it is formed and throw it into the centre of the can.

Having thus described my invention, I claim as new, and desire to secure by Letters Patent—

1. The device of a catch, $k$, or its equivalent, for locking and unlocking the beater shaft $h$, in combination with the gear-wheel $b$, by means of which separate or alternate motions may be given to the beater and the freezing can A, or both together, arranged and operated substantially as and for the purposes herein described.

2. The India-rubber packing $m\ m$ fitted on the edge of the beater wing $g$, arranged and operating substantially as and for the purpose specified.

The above specification of my invention signed by me this 28th day of January, 1867.

H. B. MASSER.

Witnesses:
    PARKER PRICE,
    N. S. ENGLE.